Dec. 11, 1928.
H. T. ROBERTS
VALVE
Filed Aug. 23, 1922
1,694,625
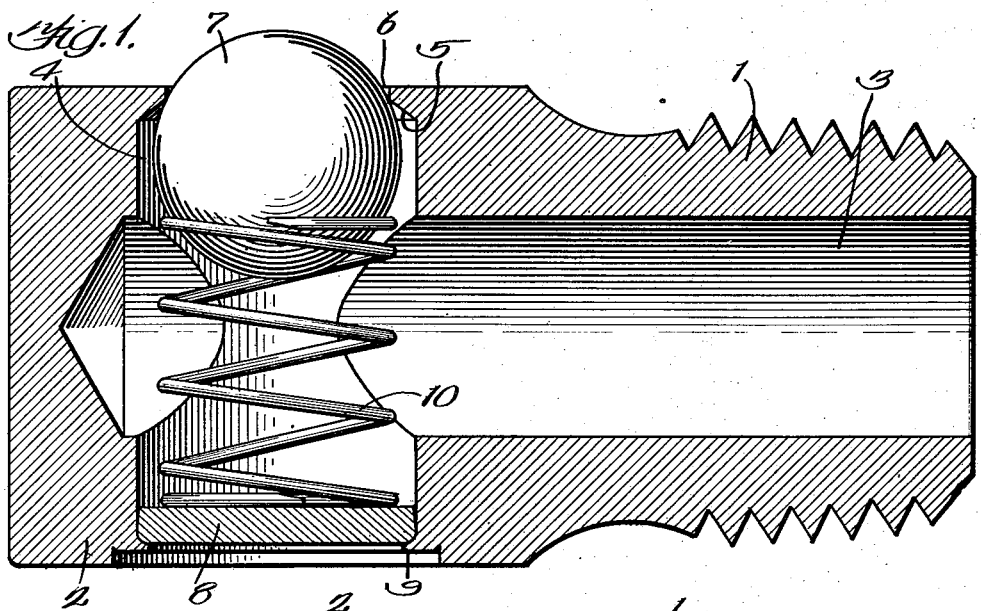
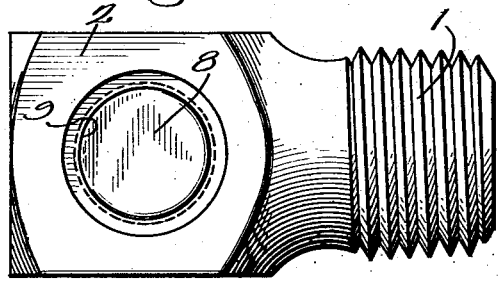
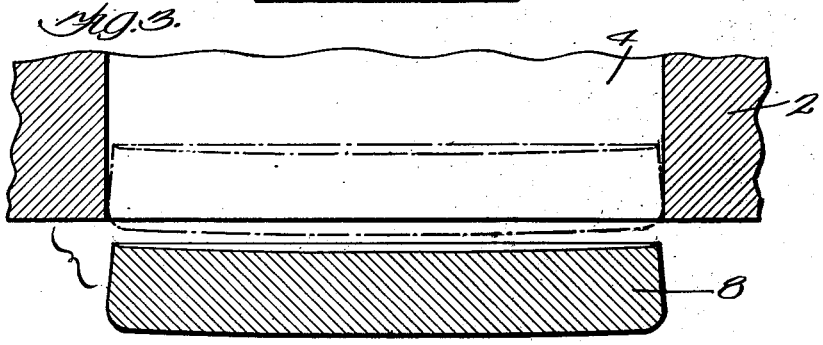
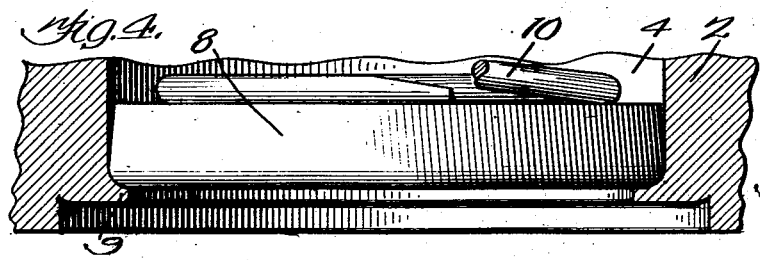
Inventor:
Henry T.
Roberts Patented Dec. 11, 1928.

1,694,625

UNITED STATES PATENT OFFICE.

HENRY T. ROBERTS, OF CHICAGO, ILLINOIS, ASSIGNOR TO ALEMITE MANUFACTURING CORPORATION, OF CHICAGO, ILLINOIS, A CORPORATION OF DELAWARE.

VALVE.

Application filed August 23, 1922. Serial No. 583,773.

My invention relates to valves of the class which are employed in the art of lubrication for the purpose of preventing the escape of lubricant that is applied to rubbing or working parts through the valves. The invention is an improvement upon those valve structures having angularly related bores.

Hitherto such valve structures have been of elbow formation, the angularly related bores being provided in the branches of the elbow. It is the general object of my invention to eliminate the elbow formation while retaining the angular relation of the lubricant conducting bores.

By means of the device of my invention all of the advantages of the valve fittings of elbow formation are retained and the disadvantage of the projecting elbow branches are eliminated, these elbow fittings being expensive in construction and of awkward formation.

The valve structure of my invention includes a nipple having one end preferably threaded for attachment to piping of a lubricating or other fluid conducting system and the other end of the nipple is enlarged into a head in which there is formed a bore at right angles to and communicating with the longitudinal bore of the nipple. Such a headed nipple with its angularly related bores thus effectively replaces and fully serves the functions of the elbow fittings of the prior art. The transverse bore in the head of the nipple preferably initially extends entirely through the head and is slightly reduced in diameter at one end to afford a seat for a ball valve. A spring is also disposed in the transverse bore in the nipple head and the end of this bore opposite the ball seat is closed by means of a disc to prevent the escape of fluid at this end of said bore and to afford a seat for the spring to enable said spring to exert closing action upon the ball valve.

The invention will be more fully explained by reference to the accompanying drawing showing the preferred embodiment thereof and in which Fig. 1 is a longitudinal sectional view on a very large scale of a valve structure made in accordance with the invention; Fig. 2 is a side view of the valve structure looking toward the closed end of the transverse bore in the nipple head; Fig. 3 is a view, somewhat diagrammatic, illustrating the manner in which the disc plug is applied; and Fig. 4 is a view showing in detail the assemblage of the disc plug and the nipple head.

Like parts are indicated by similar characters of reference throughout the different figures.

As illustrated, the nipple has a threaded shank 1 whereby it may be attached to the part to which lubricant or other fluid is to be conducted through the nipple. This nipple has an unthreaded head 2 which is preferably of cubical formation, generally speaking, this head being aligned with the shank of the nipple and overhanging the same but slightly. The longitudinal bore 3 of the nipple is desirably continued into the head beyond the transverse bore 4 formed in the head of the nipple. In producing the transverse bore 4 the boring tool is preferably of such shape as to leave a tapering shoulder 5 surrounding an inlet opening 6, the inner edge of this tapering shoulder serving as a seat for the ball valve 7. The boring tool is entered into the head from the side thereof opposite the opening 6, necessitating the closure of the bore 4 at the end thereof opposite the valve 7. This closure is desirably effected by means of a closure disc or plug 8 that is desirably initially of the formation illustrated in full lines at the part marked 8 in Fig. 3. This disc closure or plug is desirably slightly tapered and is entered into the transverse bore 4 until the base of the disc that is adapted for driving fit within the bore, occupies the position shown by the dot and dash lines in Fig. 3, whereafter a staking tool is employed to press the disc further into the bore 4 and to form the exterior seat 9 that further positions the disc and guards the same from violent external contact and further seats the bore 4 at the disc end thereof.

It is understood that the ball valve 7 and the spring 10 which exerts closing action thereon are located within the bore 4 before the disc is applied, this disc serving as a seat for the spring.

When the lubricant is to be admitted to the nipple the nozzle of the utensil that supplies the lubricant is pressed upon the ball valve to open the inlet 6 and permit the flow of the lubricant first into the transverse bore 4 of the nipple and laterally into the longitudinal bore of the nipple.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A valve comprising a nipple threaded at one end, the other end being polygonal for engagement by a tool for screwing the device into place, a lateral facing inlet opening in one of the faces of said polygonal end, and a spring-pressed check valve closing said inlet opening.

In witness whereof, I hereunto subscribe my name this 17th day of August, A. D., 1922.

HENRY T. ROBERTS.